United States Patent [19]
Olafsson

[11] Patent Number: 6,081,555
[45] Date of Patent: Jun. 27, 2000

[54] METHODS AND APPARATUS FOR IMPLEMENTING SHELL MAPPING TECHNIQUES IN THE CONTEXT OF A PCM-BASED MODEM COMMUNICATIONS SYSTEM

[75] Inventor: Sverrir Olafsson, Seltjarnarnes, Iceland

[73] Assignee: Conexant Systems, Inc., Newport Beach, Calif.

[21] Appl. No.: 08/760,646

[22] Filed: Dec. 4, 1996

[51] Int. Cl.[7] ............................ H04B 14/04; H04L 27/04; H03M 7/00; G06F 11/10

[52] U.S. Cl. ........................ 375/242; 375/295; 341/50; 371/43

[58] Field of Search ........................ 375/242, 296, 375/251, 265, 353, 259, 295, 222; 341/50; 374/43

[56] References Cited

U.S. PATENT DOCUMENTS

| | | | |
|---|---|---|---|
| 5,048,056 | 9/1991 | Goldstein | 375/261 |
| 5,056,112 | 10/1991 | Wei | 375/280 |
| 5,394,437 | 2/1995 | Ayanoglu et al. | 375/222 |
| 5,428,641 | 6/1995 | Long | 375/295 |
| 5,428,646 | 6/1995 | Eyuboglu | 375/354 |
| 5,446,758 | 8/1995 | Eyuboglu | 375/259 |
| 5,465,273 | 11/1995 | Cole | 375/296 |
| 5,486,825 | 1/1996 | Cole | 341/50 |
| 5,528,625 | 6/1996 | Ayanoglu et al. | 375/222 |
| 5,598,435 | 1/1997 | Williams | 375/261 |
| 5,818,879 | 10/1998 | Eyuboglu et al. | 375/286 |

FOREIGN PATENT DOCUMENTS

WO 96/18261 6/1996 WIPO.

OTHER PUBLICATIONS

RSA Communications, *DC Suppresser for 56K Modems*, Oct. 16–17, 1996, pp. 1–2.

Hayes Microcomputer Products, Inc., 56 kbps Channels, Oct. 14, 1996, pp. 1–4.

Racal Datacom, *V.pcm modem Standard*, Oct. 16–17, 1996.

U.S. Robotics, *U.S. Robotics' x2 Technology: Technical Brief*, Apr. 16–17, 1996.

U.S. Robotics, *Proposal for a High Speed Network Access Modem*, Apr. 16–17, 1996.

Motorola, *PCM Modems: A Technical Overview*, Oct. 16–17, 1996.

Motorla Information Systems Group (USA), *Signal Mapping and Shaping for V.Fast*, Jun. 1992, pp. 1–13.

Pierre A. Humblet and Markos G. Troulis, *The Information Driveway*, Sep. 23, 1996, pp. 1–16.

International Telecommunication Union, *A Modem Operationg at Data signalling Rates of Up to 28 800 bit/s for use on the General Switched Telephone Network and on Leased Point–to–Point 2–wire Telephone–Type Circuits*, Sep. 1994, 1–63.

*Primary Examiner*—Chi H. Pham
*Assistant Examiner*—Khai Tran
*Attorney, Agent, or Firm*—Snell & Wilmer L.L.P.

[57] ABSTRACT

An improved apparatus for implementing shell mapping in a PCM modem incorporates $\mu$-law signal mapping points. An improved signal point encoding technique effectively employs ring indices that are generated in accordance with known principles. The ring indices are applied to a reordering module, which rearranges the ring indices produced by a conventional shell mapping algorithm. A preferred reordering scheme takes advantage of the non-uniform probability distribution provided by the conventional shell mapping algorithm. The rings are rearranged such that the sets of signal points having relatively small separation distances are assigned to rings with relatively low frequencies of occurrence, while the sets of signal points having relatively large separation distances are assigned to rings with relatively high frequencies of occurrence. The reordering scheme optimizes the signal point assignment while maintaining acceptable limits for average transmission power.

35 Claims, 6 Drawing Sheets

METHODS AND APPARATUS FOR IMPLEMENTING SHELL MAPPING TECHNIQUES IN THE CONTEXT OF A PCM-BASED MODEM COMMUNICATIONS SYSTEM

FEDERALLY-SPONSORED RESEARCH OR DEVELOPMENT

Not Applicable

TECHNICAL FIELD

The present invention relates, generally, to a technique for adapting standard V.34 shell mapping algorithms for use in conjunction with PCM-based modems and, more particularly, to a technique for reordering ring indices generated by the shell mapping algorithm to yield an optimum balance between transmit power and frequency of use of constellation rings having low interval values between constellation points.

BACKGROUND ART AND TECHNICAL PROBLEMS

The present invention relates to signed point encoders used in the transmission of digital information over an analog medium connected to a digital network, particularly in the context of Pulse Code Modulation (PCM) modems.

The world based on the Internet has seen tremendous growth in recent months. As more users begin browsing and downloading information from the World Wide Web, there has been a great desire to increase the data transmission rate, or simply called data rate. The desire is even greater for users accessing the Internet through an Internet service provider (ISP), since most users are linked up to the "Net" through a personal computer and a modem. Conventional analog modems, such as V.34 modems, however, view the public switched telephone network ("PSTN") as an analog channel, even though the signals are digitized for communications throughout most of the PSTN. As such, various effects of and impairments due to signal quantization impose a limitation on the data rate of the channel to about 35 Kbps. This limit has been commonly known as Shannon's Limit. (See C. E. Shannon and W. Weaver, *The Mathematical Theory of Communication*, University of Illinois Press, 1949).

There has been much recent development of high-speed communications technology based on PCM modems, where data rates of at least 56 Kbps are said to be actually attainable. The PCM modem technology is based on the simple realization that the PSTN is increasingly a digital network and not an analog network. Also, more and more central site modems are connected to the PSTN through digital connections, i.e., T1 in the U.S. and E1in Europe, without requiring a CODEC (coder/decoder). A CODEC is a device which connects the digital portion of the network to the analog local loop and converts between analog and digital.

The conventional modem, however, still interprets this digital stream as the representation of the modem's analog signal. With the PCM modems, however, a much higher data rate can be achieved without the complicated task of re-wiring the user's site or modifying the telephone network. It should be recognized that "central site" modems refer to those modems installed at an ISP, or at a corporation, for example, to allow many simultaneous connections for remote local area network (LAN) access.

The recent 56 Kbps technology seeks to address an impaired section of the communications path of the PSTN digital network, where the impairment is due to the hybrid and the copper wire interface between the telephone central office and the user's home, usually referred to as the analog local loop.

Since recently, much has been described about PCM modems and how they can and should facilitate downstream data communication at a much higher rate than the present paradigm. For example, the PCM modem has been the subject of a recent Telecommunications Industry Association (TIA) Technical Committee TR-30 Standards meeting on Oct. 16–17, 1996. The submitted technical contributions include Guozhu Long's *DC Suppressor for 56K Modems,* Guozhu Long's *Two-Step Mappingfor 56K Modems,* David C. Rife's *56 Kbps Channels,* Veda Krishnan's *V.pcm Modem Standard,* Vedat Eyuboglu's *PCM Modems: A Technical Overview,* Richard Stuart's *Proposal for a High Speed Network Access Modem,* and Vladimir Parizhsky's *U.S. Robotics'x2 Technology: Technical Brief.* These contributions are hereby incorporated by reference.

Also, there have been recent publications on the overall data communication system based on the PCM modem. The first one is a 1995 presentation disclosed by Pierre A. Humblet and Markos G. Troulis at Institute Eurecom, entitled *The Information Driveway,* 1995, which purports to explain the basic concepts of the high speed modem. The second one is a PCT Patent Publication, dated Jun. 13, 1996, International Publication Number WO/9618261, by Brent Townshend, which discloses a High Speed Communications Systems for Analog Subscriber Connections. This Publication, on pages 17–19, discloses an overall high speed system based on PCM modems (which also implements DC null elimination on the transmitter side). These papers provide a fair reference to the basics of the high speed PCM modems and their environment, and are hereby incorporated by reference.

Additionally, U.S. Pat. No. 5,528,625, issued to Ender Ayanoglu of AT&T, dated Jun. 18, 1996, entitled High Speed Quantization-Level-Sampling Modem With Equalization Arrangement, discloses a QLS modem for high-speed data communication. Another U.S. patent also issued to Ender Ayanoglu of AT&T, U.S. Pat. No. 5,394,437, dated Feb. 28, 1995 entitled High-Speed Modem Synchronized To A Remote CODEC, discloses a high-speed modem for data transmission over an analog medium in tandem with a digital network. These references are also hereby incorporated by reference.

Figure 1:
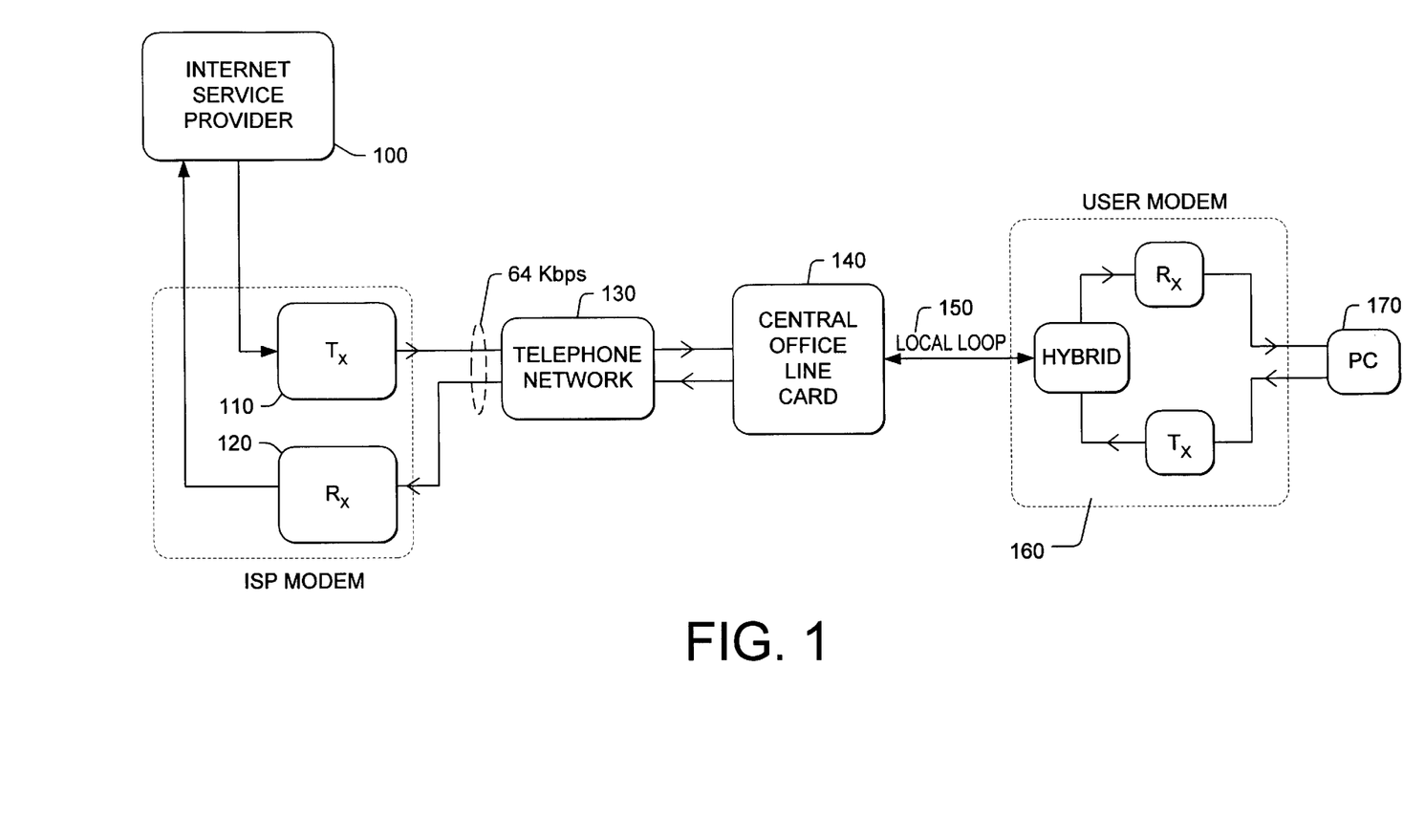
FIG. 1 depicts a conceptual diagram of a high-speed communication path using PCM modem technology.

FIG. 1 depicts a conceptual diagram of the typical high-speed communication path using PCM modem technology. An ISP, or central site, 100 is digitally connected to a telephone network 130 through its transmitter 110 and receiver 120. The network 130 is connected to a local loop 150 through a central office line card 140. The line card typically has a PCM CODEC implemented therein. The local loop 150 is connected to the user's PC at the user's site through the user's modem 160. As can be appreciated by those skilled in the art, the connection between the ISP modem transmitter 110 to the telephone network 130 is a digital connection with a typical data rate of about 64 Kbps. Since the parameters of the telephone network 130 and line card 140 are dictated and set by the telephone company's specifications and operation (and particularly their use of the $\mu$-law signal point constellation), the central site transmitter 110 needs to transmit the digital data in a particular way to fully exploit its digital connection to the network. However, dealing with $\mu$-law constellations, shell mapping, and PCM-based modem systems in this new paradigm has some obstacles.

For example, in the V.34 paradigm, the shell mapping algorithm is essentially designed to select ring indices in a manner which minimizes average transmission power based on, inter alia, the assumption that the average power of each ring is approximately proportional to its ring index, and based on the further assumption that any particular constellation can be scaled to meet the transmit power level requirement. In a PCM modem context, on the other hand, the signal points are selected from a fixed, non-uniformly spaced set of levels determined by the PCM codec in accordance with the well-known µ-law algorithm. Hence, the above assumptions made for the V.34 shell mapping algorithm break down in the context of PCM modems. Furthermore, in order to obtain optimum performance using known shell mapping techniques, an entirely new cost function different from the cost function employed in V.34 would have to be defined, and a new mapping algorithm constructed for use in a PCM modem context. The implementation of such a new cost function and mapping algorithm would not significantly exploit the V.34 algorithm, which is currently utilized by a substantial number of modems currently in use. In the V.34 signal-point encoding model, typically employed by a transmitting modem at an internet service provider (ISP server), the encoder function is often divided into two realms, including a coding part and a mapping (or shaping) component. The coding component often involves error-correction coding, whereas the mapping component strives to minimize the transmission power in view of the restraints imposed by the coding process. For example, the traditional V.34 coding function involves the use of convolutional trellis codes, whereas the mapping is in the form of shell mapping.

The shell mapping algorithm employed in V.34 is one of the more complex functions in a V.34 modem. For a more complete description of the V.34 Recommendation, see *ITU-T Recommendation V.34*, published September, 1994 by the International Telecommunication Union, the entire contents of which is hereby incorporated by this reference. Essentially, the V.34 encoding algorithm takes a block of bits corresponding to a mapping frame of eight (8) symbols, and maps a part of that block to a set of eight (8) ring indices, which are used to determine a subset of the constellation from which the transmitted signal points are selected. In this context, the subsets are, as the name indicates, in the form of concentric rings around the origin. As such, the energy of the signal points in a given ring is within a certain range, which energy range increases with increasing distance from the origin. Thus, the index of the ring is a fairly accurate approximation of the contribution to signal power of a point in that ring. The V.34 shell mapping algorithm uses this simple relationship to select sets of ring indices where the sum of the indices is the smallest. Sets of ring indices with higher sums tend to be omitted, thus optimizing transmit power. As a result, in the V.34 shell mapping algorithm, the innermost rings are selected most often, and the outermost rings are selected least often.

In PCM modems, however, the signal points are selected from a non-uniform set of levels determined by the µ-law algorithm. Many of the characteristics of the V.34 constellation are therefore lost in a PCM modem context, for example the linear relationship between ring index and that ring's contribution to transmission power.

U.S. Pat. No. 5,428,641, issued Jun. 27, 1995 to Long, and U.S. Pat. No. 5,465,273, issued Nov. 7, 1995 to Cole, generally disclose shell and frame mapping techniques that may be used in conjunction with modems and, more specifically, with V.34 transmission protocols. Both of these patents are hereby incorporated by reference. Guozhu Long's contribution to the TR-30 Standards Meeting, entitled *Two-Step Mapping for 56K Modems*, discloses a shell mapping algorithm intended to replace the standard V.34 mapping algorithm. Long's mapping technique is designed to reduce the error rate associated with 56K modems. However, such use of a new mapping algorithm may be impractical to implement or undesirable in light of the widespread use of the V.34 mapping algorithm.

A technique is therefore needed which overcomes the shortcomings of the prior art. In particular, a long felt need exists for a PCM-based signal point encoding methodology which conforms to the transmission power limitations imposed by the Public Switched Telephone Network (PSTN), which facilitates the minimization of transmission errors, and which exploits many of the advantageous features of the V.34 shell mapping algorithm.

SUMMARY OF THE INVENTION

The present invention provides methods and apparatus for implementing a V.34-type shell mapping algorithm in the context of a PCM modem. In accordance with a preferred embodiment of the present invention, a signal point encoding technique is proposed which effectively utilizes many of the advantageous aspects of the V.34 shell mapping algorithm, while modifying other V.34-type signal point encoding practices to allow the efficient use of shell mapping techniques in a PCM-based modem context. In accordance with a particularly preferred embodiment, a V.34-type shell mapping technique is employed which generates ring indices generally in accordance with known principles. These ring indices are then applied to a reordering module, for example a look up table, dynamic algorithm, or the like, such that the "ring" indices produced by the shell mapping algorithm are reordered. This reordering permits the signal point encoder of the present invention to take advantage of the non-uniform probability distribution provided by the shell mapping algorithm. At the same time, the rings are reordered in such a way as to assign the sets of constellation points with smallest minimum distances to the rings with the lowest frequency of occurrence, and the sets of points with higher minimum distances (but lower power) to the rings associated with the higher frequency of occurrence.

In accordance with a further aspect of the present invention, a signal point encoding scheme is proposed which results in an average transmission power that is substantially equal for most data rates employed in contemporary modems.

In accordance with a further aspect of the present invention, by leveraging known shell mapping models, the subject signal point encoding scheme elegantly accommodates fractional bits per symbol.

BRIEF DESCRIPTION OF THE DRAWING FIGURES

Additional features and advantages of the subject invention are hereinafter described in conjunction with the appended drawing figures, wherein like numerals denote like elements, and.

DETAILED DESCRIPTION OF PREFERRED EXEMPLARY EMBODIMENTS

In accordance with the preferred exemplary embodiments described herein, methods and apparatus are provided for reordering the ring indices output from a V.34-type shell mapper in accordance with various algorithms, goals, and cost function considerations described herein. In accordance with a preferred exemplary embodiment of the present invention, a look up table used to reorder the shell mapping indices is constructed in a manner calculated to allow optimum use of those ring indices having signal points spaced apart by $d_{min}$, while maintaining average transmission power within desired limits (e.g., the −12 dBm limit imposed by the FCC. In accordance with one embodiment, optimum ring reordering tables are arrived at through an iterative process which incrementally shifts the rings containing signal points separated by $d_{min}$ to progressively lower assignments (in terms of frequency of occurrence), until acceptable average power ranges are satisfied. As a by-product of the algorithm used to derive optimum reordering tables for each data transmission speed, approximately equal average power levels are obtained for all data transmission speeds, which facilitates simplified receiver design.

Figure 2:
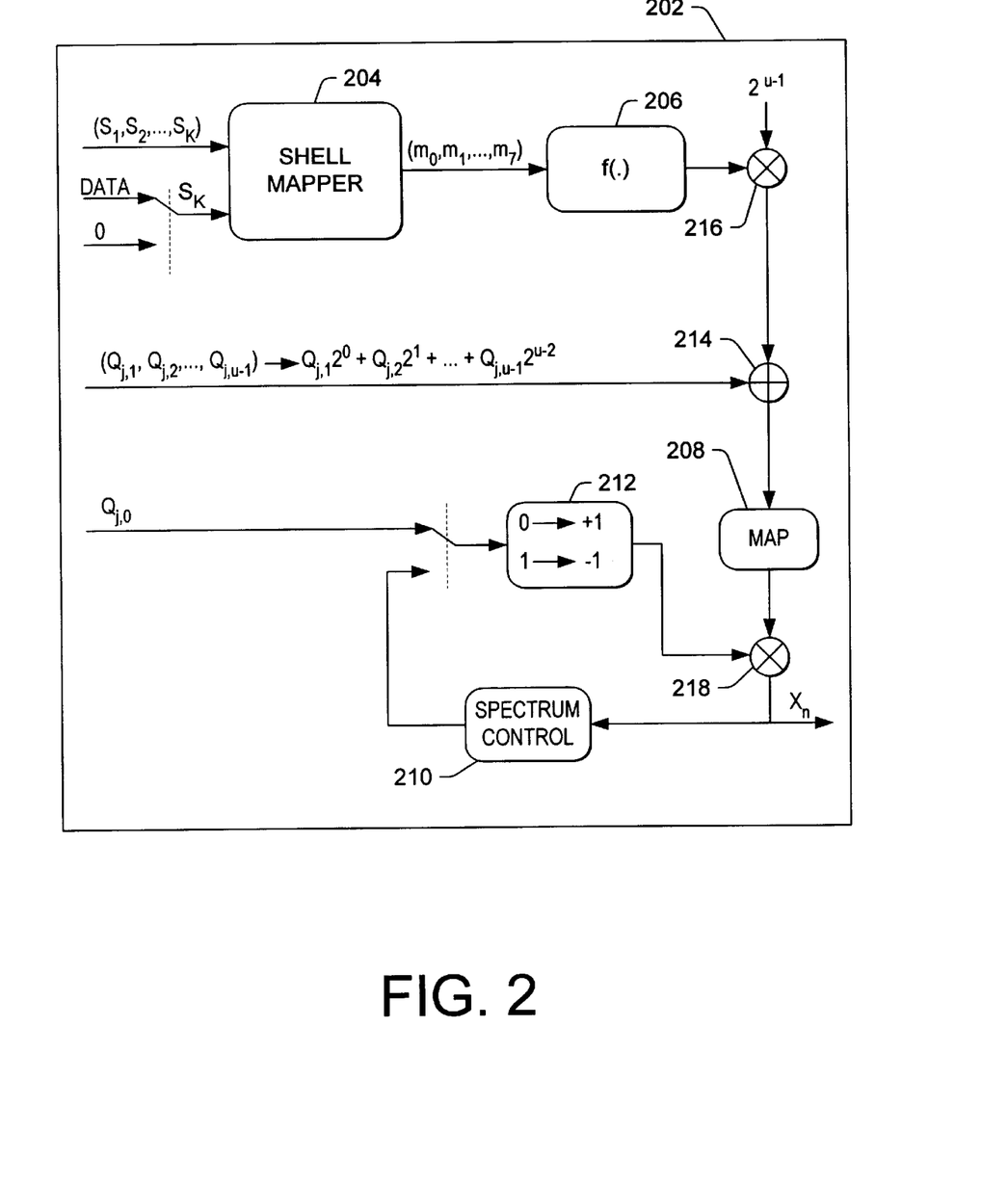
FIG. 2 is a block diagram of the shell mapping, reordering, and signal point constellation look up table components of an exemplary signal point encoder in accordance with the present invention.

Referring now to FIGS. 1 and 2, an exemplary PCM-based modem transmitter 110 suitably comprises a signal point encoder 202. In the illustrated embodiment, signal point encoder 202 comprises a shell mapper 204, a reordering look up table 206, a mapping block 208, a spectrum control circuit 210, and a polarity block 212. Those skilled in the art will appreciate that the various functional components of encoder 202, including shell mapper 204, reorder look up table 206, signal constellation mapping look up table 208, polarity block 212, and spectrum control 210 may suitably be implemented as one or a combination of discrete electronic components, integrated circuits, software modules, or any other convenient implementation.

In the preferred embodiment described herein, an exemplary mapping frame may be illustrated as follows:

Those skilled in the art will appreciate that the actual data to be transmitted by the modem through the PSTN to the receiving modem may be formatted and transmitted via any convenient methodology, for example as described in ITU Standard V.42, incorporated herein by this reference.

With continued reference to the above mapping frame, an exemplary mapping frame useful in conjunction with the present invention comprises eight (8) PCM samples per mapping frame, corresponding to a total of b bits. Of these b bits, the first K bits of a mapping frame may be conveniently used for the shell mapper (with a 0 inserted for low mapping frames), and the following b-K bits are suitably divided in eight (8) equal parts with u bits in each part depending on such factors as data rate, redundancy level, and the like. In the context of the present invention, a redundancy value of 16 means that in one out of every sixteen (16) samples, one bit is used for redundancy purposes.

The manner in which the index reordering look up tables and the signal point constellations are derived in accordance with the present invention will now be described.

Figure 3:
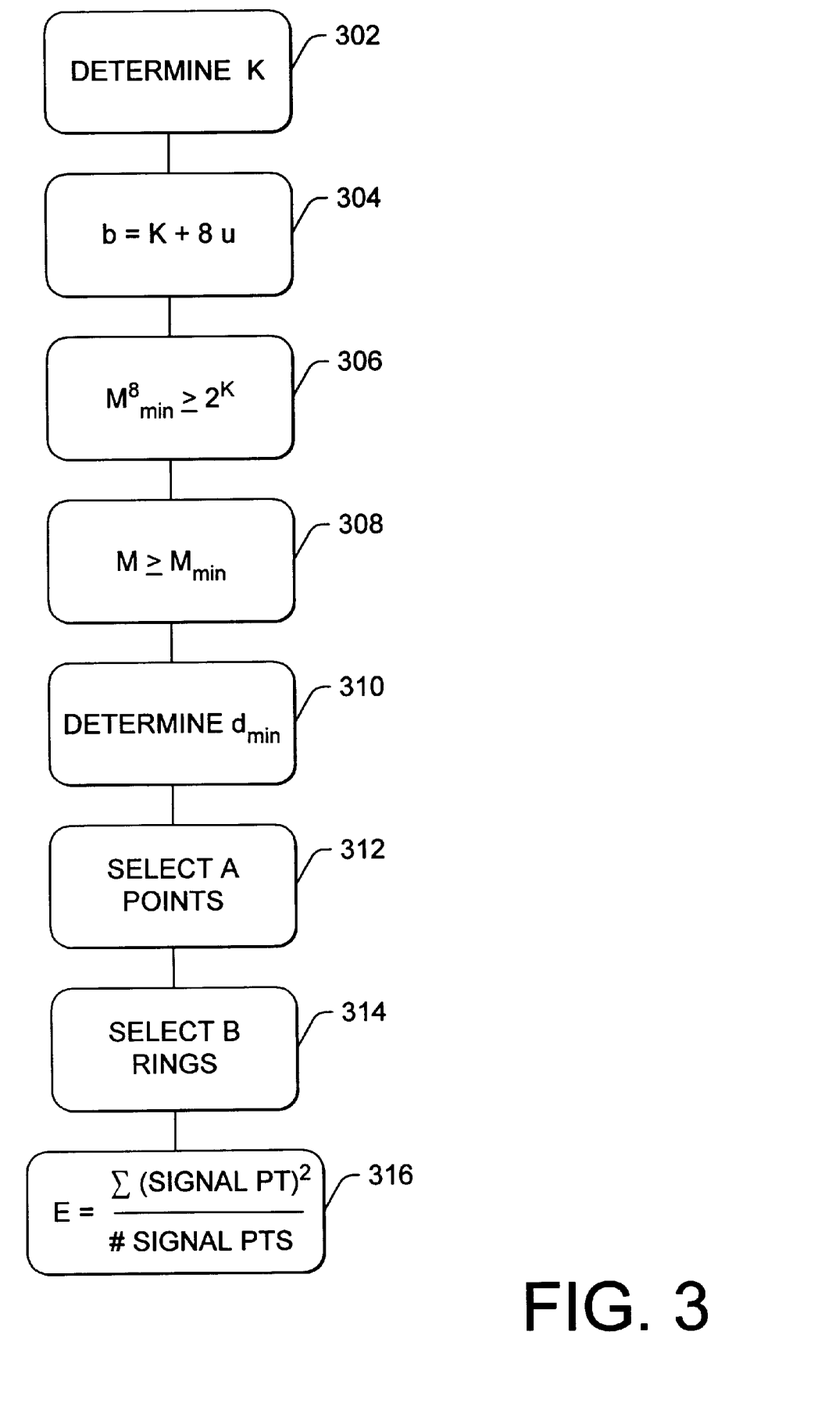
FIGS. 3–5 are flow charts describing an algorithm useful in the context of the present invention for generating signal point constellations for various data rates and reordering architectures for reordering ring indices in accordance with preferred embodiments of the present invention.

Referring now to FIGS. 2 and 3, it will be understood that a separate reordering look up table and a separate signal point constellation will be derived for each anticipated data rate R. For purposes of illustration, the ring reordering look up tables and signal point constellation tables will be set forth for data rates of 56 Kbps, 52 Kbps, 48 Kbps, 44 Kbps, 40 Kbps, 36 Kbps, and 32 Kbps. It will be appreciated, however that the methodologies and techniques described herein may suitably be applied to virtually any desired data transmission rate.

For a given data transmission rate, for example R=56 Kbps, a value of K may be determined (step 302) by first determining a value of b. In the context of this description, b=R/1000+r/8, where r is defined as the redundancy factor. For example, in the illustrated embodiment where R=56 (expressed in Kbps), b=57. The value of K may then be determined from b by subtracting eight from b an integer number (u) of times until K has an integer value of between 24 and 31, inclusive (i.e., $24 \leq K \leq 31$) (step 304).

Having determined an appropriate value of K for a given data rate, the system then determines the minimum number of rings ($M_{min}$) such that $M^8_{min}$ is greater than or equal to $2^K$ (step 306). Indeed, once K is determined, the value of $M_{min}$ will necessarily be an unambiguous integer. The system then chooses an appropriate constellation expansion factor to yield the actual number of rings M, which may be greater than or equal to $M_{min}$ (step 308). In this regard, if $M^8_{min}$ is approximately equal to $2^k$ (i.e., the rings have approximately equal output probabilities), it may be desirable to increase M by one or two to thereby vary the probability associated with the various ring indices. It will be appreciated that M may be increased by one or two, or even more, although it is generally desirable to increase M by one to keep overall power within reasonable limits. Furthermore, increasing M

TABLE 1

Allocation of bits in a mapping frame.

| K | u | u | u | u | u | u | u | u |
|---|---|---|---|---|---|---|---|---|

⇐--------------------x-----------x----------x-----------x----------x-----------x----------x---------⇨⇐-----⇨
Shell         Sample    Sample    Sample    Sample    Sample    Sample    Sample    Sample
Mapper ⇐---------------------------                                                         -----------------------⇨
First in time                                                                           Last in time increases the signal's peak-to-mean ratio, which thereby increases the effect of nonlinear distortion.

Having arrived at an appropriate value of M corresponding to the number of "rings" (i.e., levels) associated with a particular data rate R, the system then selects a tentative minimum distance $d_{min}$ for that data rate (step 310). In particular, a tentative minimum distance $d_{min}$ is suitably selected such that $b^{1/8}$ points can be selected from the set of $\mu$-law levels. That is, when calculating $b^{1/8}$, the value should be rounded upward to the next integer value; it is this integer value number of points that is minimally required to convey the number of bits b. If the average energy of the set of points of that number is close to the corresponding transmit power limitation, then the $d_{min}$ can be considered suitable.

The system then determines a set A of M*$2^u$ constellation points from the $\mu$-law set with minimum distance $d_{min}$ and minimum energy (step 312). At this time, it is known how many total points are in the signal constellation for a particular data rate, and it is also known that each ring contains the same number of signal points. It is further known that $2^u$ signal points are associated with each ring. Thus, the first point selected would be the smallest signal level in the $\mu$-law set greater than or equal to $d_{min}/2$. The second point would be the smallest signal level in the $\mu$-law set greater than or equal to the sum of the first point and $d_{min}$. Continuing in this fashion, the n-th point would be selected as the smallest signal level in the $\mu$-law set greater than or equal to the sum of point n-1 and $d_{min}$.

A subset of rings (B) is then selected from the set of points A (step 314). More particularly, a set of rings B is selected which includes points with distance $d_{min}$ to adjacent points such that B has a value of between 1 and M, inclusive (i.e., $1 \leq B \leq M$). In step 314, it is also desirable to determine the number of "distances" which are in each of the rings which comprise B.

More particularly, and with reference to the following exemplary signal constellation for 56 Kbps (minimum distance 12,144 total points, only positive values shown):

TABLE 2

56 Kbps Constellation 6, 18, 30, 45, 57, 69, 81, 93
107, 123, 139, 155, 171, 187, 203, 219
231, 247, 263, 279, 295, 311, 327, 343
359, 375, 391, 407, 423, 439, 455, 471
495, 527, 559, 591, 623, 655, 687, 719
751, 783, 815, 847, 879, 911, 943, 975
1023, 1087, 1151, 1215, 1279, 1343, 1407, 1471
1535, 1599, 1663, 1727, 1791, 1855, 1919, 1983
2079, 2207, 2335, 2463, 2591, 2719, 2847, 2975

It will be appreciated that the above signal constellation corresponds to set A, that each point within the 56 Kbps signal constellation is also selected from the set of $\mu$-law values, and that each horizontal line in the constellation corresponds to a ring index (m). To determine the set of rings B from the illustrated set A of signal constellation points, each "B" ring may be identified in the following manner: beginning with the first ring, i.e., m=0, the number of $d_{min}$ "distances" is ascertained by inspecting each point in the first ring. The first point in the ring (6) has two adjacent points (18 and -6) from which it is separated by $d_{min}$. In the example constellation shown, $d_{min}$=12. The second point in the first ring (18) has two adjacent points (6 and 30) from which it is separated by $d_{min}$. The third point in the first ring (30) has only one adjacent point (18) from which it is separated by $d_{min}$, and so on. Thus it can be seen that the first ring has at least one point which is separated from an adjacent point by $d_{min}$, and thus is included in the set of rings B. Moreover, it can also be seen that the first ring has a total "count" of 13, indicating that the first ring comprises 13 such "distances". It can similarly be seen that ring m=1 and ring m=2 each have a single occurrence wherein a point in the ring is separated from an adjacent point by $d_{min}$. By inspection, it can also be seen that rings m=3 through m=8 contain no points which are separated from an adjacent point by $d_{min}$, and hence the set of rings B for the 56 Kbps constellation table includes three rings, namely, rings m=0, m=1, and m=2. Moreover, ring m=0 has thirteen such "distances", and rings m=1 and m=2 each have one "distance".

The system next determines the average energy of each of the rings in the constellation (step 316). The average energy for each ring may be conveniently computed for each ring by summing the squares of all the signal point values in the ring, and dividing the sum by the number of points in the ring.

Having determined those rings which are in B (and hence those rings which are not in B), and further having determined the average energy associated with each ring, the system determines an initial reordering of the ring values.

Figure 4:
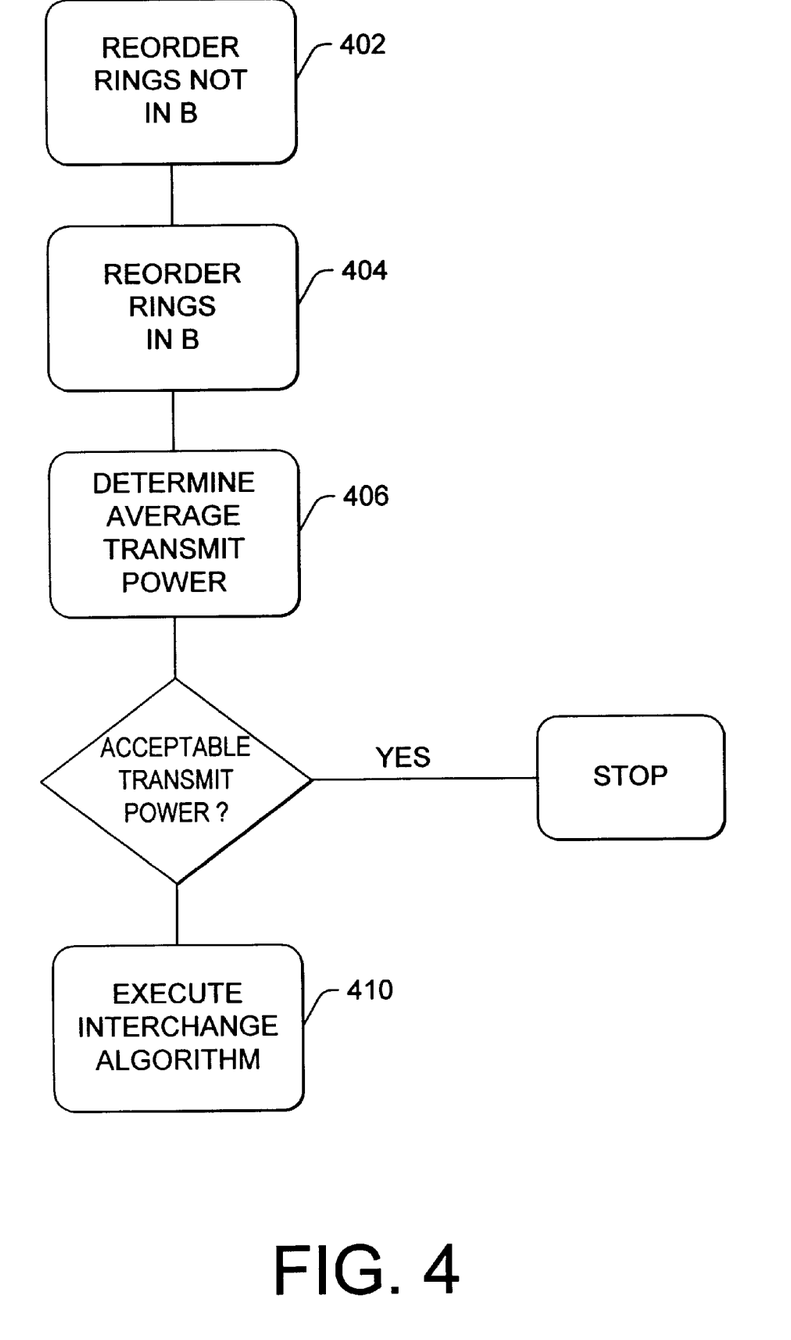

More particularly and referring now to FIG. 4, the system assigns the ring not in B with the smallest average energy to m=0, then the ring not in B with the second smallest energy to m=1, and so on until all the rings not in B are assigned (step 402). The system then assigns the ring in B with the largest number of $d_{min}$ distances (described above in conjunction with step 314) to the shell mapper ring index m=M-1, the ring in B with the second largest number of $d_{min}$ distances to m=M-2, and so on until all rings in B are assigned (step 404). Having completed steps 402 and 404, the system will have generated the following initial assignment order:

TABLE 3

Initial Reorder Table

| Reorder Index | PCM-constellation point ring |
|---|---|
| 0 | Ring not in B with lowest energy |
| 1 | Ring not in B with 2nd lowest energy |
| ... | |
| | Ring not in B with highest energy, |
| | Ring in B with lowest number of $d_{min}$ distances |
| | Ring in B with 2nd lowest number of $d_{min}$ distances |
| ... | |
| M-1 | Ring in B with highest number of $d_{min}$ distances |

The system then determines the average transmit power given the current assignment (step 406). More particularly, the system suitably runs an appropriate shell mapper algorithm (e.g., the V.34 shell mapper algorithm) for random inputs to obtain an average probability (or output frequency) associated with each ring level. For each ring level, the average probability multiplied by the average ring energy (previously calculated in step 316, yields a fairly accurate indication of the average contribution to the transmit power of each ring level.

Having determined the average transmit power for each ring assignment (step 406), the system can determine if the then current ring assignment produces a reordering of ring indices which yields acceptable power levels, i.e., the system determines whether the current reordered ring assignments allows the signal point encoder to operate within an acceptable power transmission range. If power transmission levels are acceptable ("yes" branch from step 408), the reordering algorithm may be completed, with the current reordering configuration suitably encoded into read only memory or other appropriate medium associated with reorder look up table 206 (see FIG. 2). Alternatively, if acceptable transmit power is determined at step 408, the system may also suitably reevaluate $d_{min}$ to check if a value of $d_{min}$ has been selected which is too small for optimum performance.

If the transmit power in view of the current ring assignments is still unacceptably high ("no" branch from step 408), the system is instructed to perform the following interchange algorithm to manipulate the reordered ring assignments to achieve acceptable transmit power levels (step 410). In this regard, it is desirable to reevaluate the transmit power associated with the then current assignments after each interchange; if after a single interchange the overall transmit power is acceptable, the system suitably concludes that an appropriate ring index reordering configuration has been established, and the then current reordering table may be written into index reorder look up table 206.

It should also be mentioned that when determining whether overall power levels are acceptable in the context of this discussion, it may be desirable to use as a threshold a power level other than that dictated by the FCC or the PSTN (currently −12 dBm. For example, it may be desirable to use an even more conservative (i.e., lower) transmit power threshold, for example in the range of −15 dBm.

With continued reference to the foregoing Initial Reordering Table (Table 3) and referring now to FIG. 5, a suitable interchange algorithm useful in the context of the present invention for optimizing ring reorder assignments will now be described.

Initially, the ring not in B having the highest energy is "shifted" to the index immediately above the ring in B having the lowest number of $d_{min}$ distance and the rings are suitably re-indexed (step 502). This shifting may be visualized as downward movement of the ring in, e.g., Table 3. As stated above, after each interchange, the overall transmit power of the reorder table should be reevaluated to determine if it is acceptable; if transmit power is acceptable, a satisfactory reorder look up table has been established. If transmit power is still unacceptable, then continued shifting should be undertaken.

The ring not in B having the highest energy (most recently interchanged in step 502) is then shifted to the index immediately above the ring having the second lowest number of $d_{min}$ distances (step 504), and so on. More particularly and with reference to step 505 and the above Initial Reorder Table (Table 3), the interchange process continues iteratively down the table, with the net effect that the original ring corresponding to points not in B with highest energy is sequentially moved down the table until it is assigned to the highest reorder index (i.e., it may eventually be shifted to the index immediately above the ring in B having the highest $d_{min}$ count). However, as stated above, it is important to reevaluate total transmit power after each individual interchange, to ensure that the ring not in B having the highest energy is pushed down the "frequency of use" spectrum only as far as necessary to obtain acceptable overall transmit power. Viewed from an alternate perspective, if the ring not in B having the highest energy is moved farther down the "frequency of use" chain than necessary to achieve acceptable transmit power, then it is possible that optimal transmission error control may be compromised, inasmuch as it is typically desirable to utilize as infrequently as possible the rings in B that yield acceptable overall transmit power.

With continued reference to FIG. 5, if the transmit power is still not acceptable following step 505, the current reorder table will have become as follows:

TABLE 4

First Revised Reorder Table

| Reorder Index | PCM-constellation point ring |
|---|---|
| 0 | Ring not in B with lowest energy |
| 1 | Ring not in B with 2nd lowest energy |
| ... | |
| | Ring not in B with 2nd highest energy |
| | Ring in B with lowest number of $d_{min}$ distances |
| | Ring in B with 2nd lowest number of $d_{min}$ distances |
| ... | |
| M-2 | Ring in B with highest number of $d_{min}$ distances |
| M-1 | Ring not in B with highest energy |

Using the First Revised Reorder Table (Table 4), the ring corresponding to the set of points not in B having the second highest energy is suitably the ring in B having the lowest number of $d_{min}$ distances (step 506). If necessary shifted to the index immediately above the ring not in B with the second highest energy (just interchanged in step 506) is then shifted to the index immediately above the ring in B with the second lowest number of $d_{min}$ distances, and so on (step 508) until the ring not in B with the second highest energy is sequentially shifted to the index immediately above the ring in B having the highest $d_{min}$ count (of course, the overall transmit power should be evaluated after each interchange, as discussed above). The above interchanges are then sequentially repeated (step 509) for the ring not in B with the third highest energy, the fourth highest energy, and so on. If an acceptable transmit power has not been reached following step 509, the ordering will have become as follows in Table 5:

TABLE 5

Second Revised Reorder Table

| Reorder Index | PCM-constellation point ring |
|---|---|
| 0 | Ring in B with lowest number of $d_{min}$ distances |
| 1 | Ring in B with 2nd-lowest number of $d_{min}$ distances |
| ... | |
| | Ring in B with highest number of $d_{min}$ distances |
| | Ring not in B with lowest energy |
| | Ring not in B with 2nd-lowest energy |
| ... | |
| M-2 | Ring not in B with 2nd-highest energy |
| M-1 | Ring not in B with highest energy |

If necessary, the system now interchanges among the rings in B starting with the ring in B with the highest energy, shifting it to the index immediately above the ring in B with the next highest ring assignment (step 510). If necessary, this ring is iteratively shifted through the next highest ring assignments until the ring in B with the highest energy has the highest ring index of the sets of rings in B (step 511). In this regard, while the ring in B with the highest energy generally corresponds to the rings with the fewer minimum distances, this may not necessarily be true in all instances.

If acceptable power levels have not yet been achieved, the system shifts the ring in B with the second highest energy to the index immediately above with the ring in B having the next higher ring assignment, and thereafter with the ring in B having the next higher ring assignment, and so on, until the ring in B with the second highest energy has the second highest ring index of the rings in B (step 512). If the reorder configuration still does not yield acceptable transmit power, then the ring in B with the third highest energy is shifted to the index immediately above the ring in B having the next highest ring index, and thereafter the ring in B with the third highest energy is shifted to the index immediately above the ring in B having the next higher ring assignment, and so on until all the sets of points (rings) in B are ordered by increasing average energy (step 514).

Following step 514, the PCM constellation rings are suitably ordered in increasing transmit power, thus providing a ring index reordering table which yields the lowest overall transmit power, since the ring indices are ordered in decreasing rate of occurrence. No other assignment within the model should yield a lower transmit power. Thus, if unacceptable power transmit levels have not yet been achieved, it may be desirable to modify either M or $d_{min}$ (step 516).

More particularly, if an increase in M is acceptable, it may be desirable to increase M by 1 (or even by 2), as long as increasing M results in an index reorder table which yields acceptable power transmit values. In addition, it may also be desirable to select a lower $d_{min}$ and repeat steps 312–514. Note, however, that if increasing M (step 516) does not yield acceptable transmit powers, it may be desirable to decrease M back to its original value (or even to decrease M by one or two) before selecting a lower $d_{min}$.

The foregoing algorithm is virtually assured of leading to an acceptable result, since the interchanges ultimately lead to an optimum configuration with respect to the transmit power. The procedure set forth in step 516 will lead to a lower transmit power in the next sequence of interchanges until the desired power level is reached.

Figure 5:
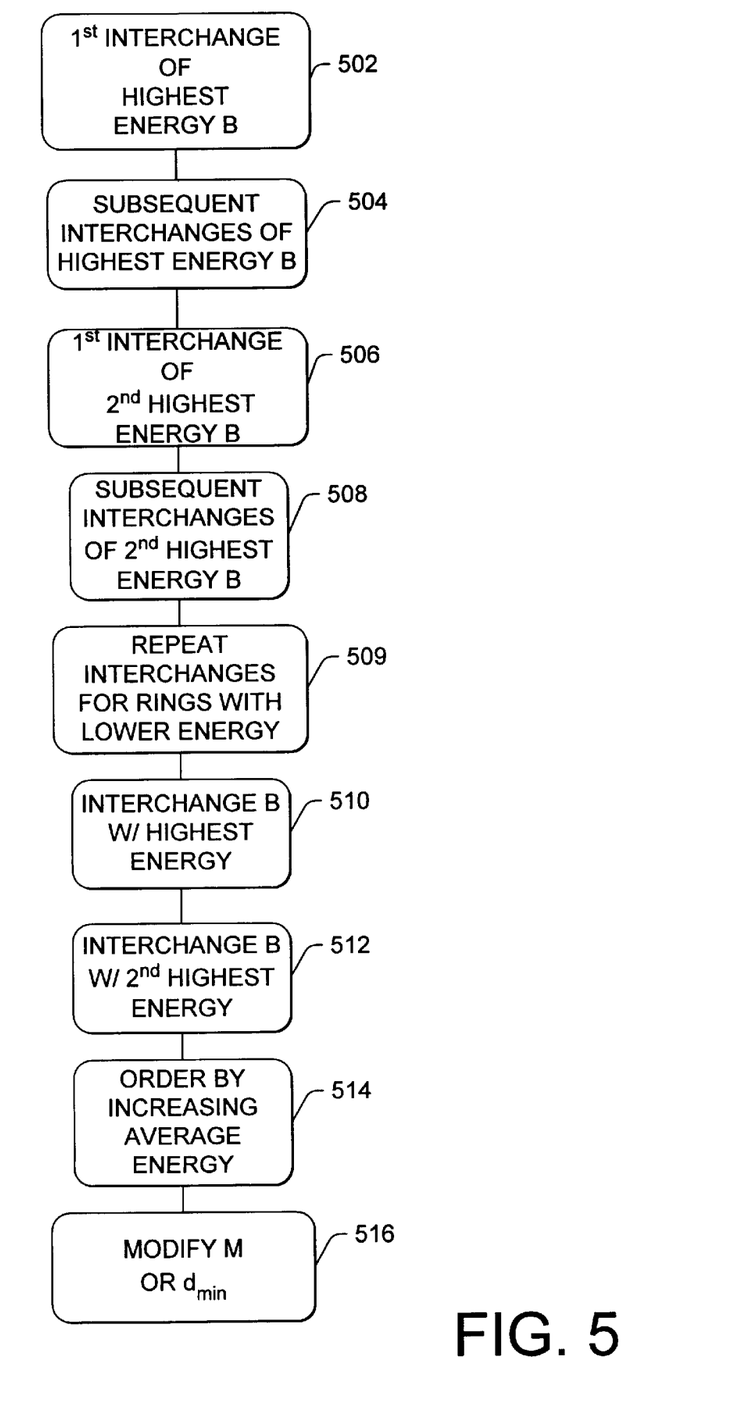

In accordance with an alternate embodiment, an exhaustive search through all possible assignments would also reveal an optimum assignment, in lieu of the steps outlined in FIGS. 3–5. However, it is believed that such an exhaustive search would not yield an appreciably better result than the above algorithm.

Having established optimum ring index reorder tables for each operating speed, these ring index reordering tables may be written into reorder table 206 in any convenient manner. The following table sets forth the values for b, r, K, M, the points/ring, and L for various data rates ranging from 56 Kbps to 32 Kbps:

TABLE 6

| Data Rate, R | b  | r  | K  | M  | Points/ring | L  |
|---|---|---|---|---|---|---|
| 56 000 | 57 | 16 | 25 | 9  | 2 × 8 | 72 |
| 52 000 | 53 | 16 | 29 | 14 | 2 × 4 | 56 |
| 48 000 | 50 | 4  | 26 | 11 | 2 × 2 | 44 |
| 44 000 | 46 | 4  | 30 | 16 | 2 × 2 | 32 |
| 40 000 | 44 | 2  | 28 | 12 | 2 × 2 | 24 |
| 36 000 | 40 | 2  | 24 | 9  | 2 × 2 | 18 |
| 32 000 | 36 | 2  | 28 | 14 | 2 × 1 | 14 |

With reference to the above table, it will be appreciated that the following column headings correspond to the following values.

b: the total number of data bits per mapping frame (8 samples).

r: the redundancy, where, in every r-th sample, the sign bit is utilized for spectrum control.

K: the number of input bits to the shell mapper.

M. the number of rings utilized in shell mapping for the particular data rate. points/ring: the number of points in each ring, i.e., $2^u$.

L. the total number of positive signal points, i.e., $(M)2^u/2$. It will also be appreciated that the value of L represents only the number of positive values set forth in the signal constellation for each data rate, it being understood that an equal number of mirror image negative values are also included in the constellation for each data rate, with the positive and negative signal points within each constellation being symmetric about the zero axis.

Referring again to FIG. 2, as the first K bits (K=25 for 56 Kbps in the illustrated example) are applied to shell mapper 204, shell mapper 204 outputs 8 ring index values labeled $m_0, m_1 \ldots m_7$ in FIG. 2. These initial 8 ring indices are suitably applied to reordering look up table 206, which comprises the optimum reorder configurations determined in accordance with the algorithm discussed above in conjunction with FIGS. 3–5. More particularly, one possible set approaching an optimum ring order configuration for various data rates, as suitably reflected in reorder table 206, is as follows:

Ring order for 56 Kbps:  3, 4, 2, 5, 1, 0, 6, 7, 8
   (i.e., f(0) = 3, f(1) = 4, . . . )
Ring order for 52 Kbps:  3, 5, 6, 7, 8, 4, 2, 9, 1, 0, 10, 11, 12, 13
Ring order for 48 Kbps:  8, 9, 7, 6, 5, 4, 3, 2, 1, 10, 0
Ring order for 44 Kbps:  7, 8, 2, 3, 4, 5, 6, 0, 1, 9, 10, 11, 12, 13, 14, 15
Ring order for 40 Kbps:  4, 5, 2, 3, 0, 1, 6, 7, 8, 9, 10, 11
Ring order for 36 Kbps:  0, 1, 2, 7, 5, 4, 6, 3, 8
Ring order for 32 Kbps:  0, 1, 2, 3, 4, 5, 6, 7, 8, 9, 10, 11, 12, 13

The output of reorder table 206 suitably embodies the reordered ring indices, which are reordered in accordance with the above reordering configurations. The reordered ring indices output from module 206 are suitably applied to a multiplier 216, which advantageously shifts the ring indices to the left by a desired number of bits, as is known in the art. The left-shifted, reordered ring indices are then summed with the mapping values $(Q_{j,1}, Q_{j,2}, \ldots, Q_{j,u-1})$ at summer 214. The output of summer 214, the signal point index, is suitably applied to mapping module 208, wherein the appropriate signal values are selected. Given a table of signal points as in Table 2, the signal point index represents an index directly determining which signal point is selected from the table.

More particularly, mapping module 208 suitably comprises a unique, predetermined signal constellation for each anticipated data rate. For completeness, exemplary signal constellations for various data rates, which are suitably encoded within mapping module 208, are as follows:

Signal constellation for 56 Kbps (minimum distance 12, 72 points)

6, 18, 30, 45, 57, 69, 81, 93
   107, 123, 139, 155, 171, 187, 203, 219
   231, 247, 263, 279, 295, 311, 327, 343
   359, 375, 391, 407, 423, 439, 455, 471
   495, 527, 559, 591, 623, 655, 687, 719
   751, 783, 815, 847, 879, 911, 943, 975
   1023, 1087, 1151, 1215, 1279, 1343, 1407, 1471
   1535, 1599, 1663, 1727, 1791, 1855, 1919, 1983
   2079, 2207, 2335, 2463, 2591, 2719, 2847, 2975

Signal constellation for 52 Kbps (minimum distance 24, 56 points):

12, 37, 61, 85
   115, 139, 163, 187
   211, 247, 279, 311
   343, 375, 407, 439
   471, 495, 527, 559

-continued

Signal constellation for 56 Kbps (minimum distance 12, 72 points)
591, 623, 655, 687
719, 751, 783, 815
847, 879, 911, 943
975, 1023, 1087, 1151
1215, 1279, 1343, 1407
1471, 1535, 1599, 1663
1727, 1791, 1855, 1919
1983, 2079, 2207, 2335
2463, 2591, 2719, 2847

Signal constellation for 48 Kbps (minimum distance 33, 44 points)

16, 49, 81, 115
147, 179, 211, 247
279, 311, 343, 375
407, 439, 471, 527
559, 591, 623, 655
687, 719, 751, 783
815, 847, 879, 911
943, 975, 1023, 1087
1151, 1215, 1279, 1343
1407, 1471, 1535, 1599
1663, 1727, 1791, 1855

Signal constellation for 44 Kbps (minimum distance 64, 32 points)

33, 99
163, 231
295, 359
423, 495
559, 623
687, 751
815, 879
943, 1023
1087, 1151
1215, 1279
1343, 1407
1471, 1535
1599, 1663
1727, 1791
1855, 1919
1983, 2079

Signal constellation for 40 Kbps (minimum distance 64, 24 points)

37, 115
187, 263
343, 423
495, 591
687, 783
879, 975
1087, 1151
1215, 1279
1343, 1407
1471, 1535
1599, 1663
1727, 1791

Signal constellation for 36 Kbps (minimum distance 96, 18 points)

49, 147
247, 343
439, 559
655, 751
847, 943
1087, 1215
1343, 1471
1599, 1727
1855, 1983

Signal constellation for 32 Kbps (minimum distance 128, 14 points)

81
247
407
591
751
911
1087
1279
1471
1599
1727

-continued

Signal constellation for 56 Kbps (minimum distance 12, 72 points)
1855
1983
2207

It will be appreciated that the foregoing signal constellations are also derived in accordance with the algorithm discussed above in conjunction with FIGS. 3–5, and most particularly at step 312 (described in more detail above).

Once the signal point indices values are mapped to the signal constellation points in mapping module 208, the output from module 208 is suitably applied to a multiplier 218, whereupon a polarity bit from polarity module 212 is combined with the output of mapping module 208 to ensure that the encoded signal output from multiplier 218 includes the appropriate polarity.

Spectrum control unit 210 suitably controls the spectrum of the transmitted PCM signal by modifying the sign of every r-th sample based on an objective function of $C_n$, where:

$$c_n = \sum_{m=0}^{n} x_m$$

Thus, the metric $C_n$ is calculated for each output sample $x_n$, and the sign of every r-th sample is determined by considering $C_n$. If $C_n$ is negative, the bit $Q_{j,0}$ is set to 0 and the outgoing sample is thus positive. If $C_n$ is positive or 0, $Q_{j,0}$ is set to 1 and the outgoing sample becomes negative. In the preferred embodiment, a redundant-sign algorithm is used for spectrum control. A more detailed description of such an algorithm is set forth in a United States patent application entitled *System for Controlling and Shaping the Spectrum and Redundancy of Signal-Point Limited Transmission*, by Sverrir Olafsson, Zhenyu Zhou, and Xuming Zhang, filed on or about Nov. 27, 1996, Ser. No. 08/756,383. The above-identified patent application is hereby incorporated by reference. Those skilled in the art will appreciate that other suitable algorithms may be implemented in spectrum control unit 210.

In accordance with a further embodiment, it may be desirable to eschew reordering entirely, focusing rather on increasing the minimum distance in the sets with the highest rate of occurrence of $d_{min}$.

Figure 6:
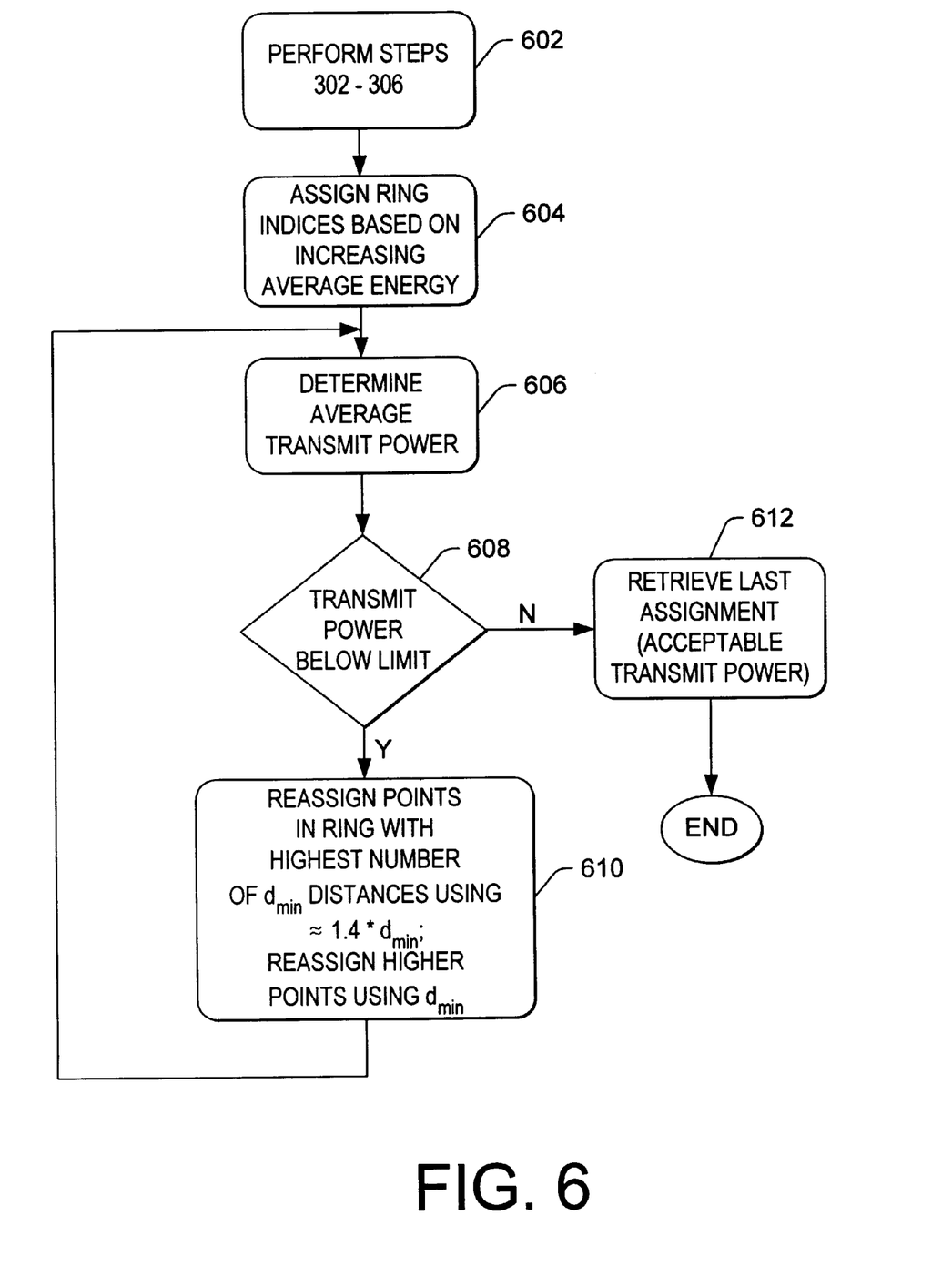
FIG. 6 is a flow chart describing an alternative to reordering methodology for optimizing transmission power in the context of the subject signal point encoder.

Referring now to FIG. 6, initial parameters such as M, $d_{min}$, A, and b are determined as set forth in steps 302–316 (step 602). The system then assigns ring indices to sets of rings as a function of increasing average energy (step 604); that is, the ring indices which are generated by shell mapper 204 are used essentially as they are output from shell mapper 204, without reordering. The system then determines the average transmit power given the current assignment (step 606).

If the transmit power is acceptable, i.e., below the power limit, then the system determines which ring R' has the highest number of $d_{min}$ distances (step 610). The signal points in R' are then reassigned in such a way as to increase the minimum distance of points in that ring to $d' \approx 1.4 * d_{min}$. This can be accomplished by first selecting the smallest point from the $\mu$-law set at distance d' above the highest point of the next lower ring R'−1 (if R'=0, then the smallest point greater than or equal to d'/2 is selected). Then, points are selected from the $\mu$-law set which are the smallest such that the distance from the previous point is greater than or equal to d'. After the set of points in R' have been reassigned, the system reassigns points in rings above R', using a distance of $d_{min}$ (except for the first point above R', which is at a distance d' from the highest point in R'). Thus, R' is effectively removed from the set B.

The system then returns to step 606, using the new signal point assignment. If the resulting transmit power is still below the transmit power limit, step 610 is repeated with a different ring. Steps 606 and 610 are repeated until the resulting transmit power becomes too high. Then, the last signal point assignment that resulted in an acceptable transmit power level is selected (step 612).

In summary, the present invention provides methods and apparatus for implementing a V.34-type shell mapping algorithm in the context of a PCM modem. The proposed signal point encoding scheme results in an average transmission power that is substantially equal for most data rates employed in contemporary modems. In addition, by leveraging known shell mapping models, the subject signal point encoding scheme elegantly accommodates fractional bits per symbol.

The present invention has been described above with reference to preferred embodiments. However, those skilled in the art will recognize that changes and modifications may be made to the described embodiments without departing from the scope of the present invention. These and other changes or modifications are intended to be included within the scope of the present invention, as expressed in the following claims.

What is claimed is:

1. A signal point encoder comprising:
   first means for mapping first digital input data into an output including a number of ring indices;
   means for reordering said ring indices according to a reordering algorithm to thereby produce a number of reordered ring indices; and
   second means for mapping second digital input data into a number of signal points, said second means for mapping being responsive to said reordered ring indices;
   wherein said means for reordering reorders said ring indices according to a function f(x)=y, where x is the reordered ring index and y is the initial ring index; and for a data rate of approximately 56 kbits/second, f(0)= 3, f(1)=4, f(2)=2, f(3)=5, f(4)=1, f(5)=0, f(6)=6, f(7)=7, and f(8)=8.

2. A signal point encoder according to claim 1, wherein said first means for mapping comprises a shell mapper configured to produce a plurality of ring indices in accordance with V.34 ring indexing techniques.

3. A signal point encoder according to claim 2, wherein each of said ring indices is associated with a discrete subset of μ-law signal points.

4. A signal point encoder according to claim 1, wherein said means for reordering comprises a look up table that associates said ring indices with said number of reordered ring indices.

5. A signal point encoder according to claim 1, wherein said second means for mapping comprises a mapping module that associates said reordered ring indices with transmit signal points associated with a signal point constellation.

6. A signal point encoder comprising:
   first means for mapping first digital input data into an output including a number of ring indices;
   means for reordering said ring indices according to a reordering algorithm to thereby produce a number of reordered ring indices; and
   second means for mapping second digital input data into a number of signal points, said second means for mapping being responsive to said reordered ring indices;
   wherein said means for reordering reorders said ring indices according to a function f(x)=y, where x is the reordered ring index and y is the initial ring index; and for a data rate of approximately 52 kbits/second, f(0)= 3, f(1)=5, f(2)=6, f(3)=7, f(4)=8, f(5)=4, f(6)=2, f(7)=9, f(8)=1, f(9)=0, f(10)=10, f(11)=11, f(12)=12, and f(13)=13.

7. A signal point encoder comprising:
   first means for mapping first digital input data into an output including a number of ring indices;
   means for reordering said ring indices according to a reordering algorithm to thereby produce a number of reordered ring indices; and
   second means for mapping second digital input data into a number of signal points, said second means for mapping being responsive to said reordered ring indices;
   wherein said means for reordering reorders said ring indices according to a function f(x)=y, where x is the reordered ring index and y is the initial ring index; and for a data rate of approximately 48 kbits/second, f(0)= 8, f(1)=9, f(2)=7, f(3)=6, f(4)=5, f(5)=4, f(6)=3, f(7)=2, f(8)=1, f(9)=10, and f(10)=0.

8. A signal point encoder comprising:
   first means for mapping first digital input data into an output including a number of ring indices;
   means for reordering said ring indices according to a reordering algorithm to thereby produce a number of reordered ring indices; and
   second means for mapping second digital input data into a number of signal points, said second means for mapping being responsive to said reordered ring indices;
   wherein said means for reordering reorders said ring indices according to a function f(x)=y, where x is the reordered ring index and y is the initial ring index; and for a data rate of approximately 44 kbits/second, f(0)= 7, f(1)=8, f(2)=2, f(3)=3, f(4)=4, f(5)=5, f(6)=6, f(7)=0, f(8)=1, f(9)=9, f(10)=10, f(11)=11, f(12)=12, f(13)=13, f(14)=14, and f(15)=15.

9. A signal point encoder comprising:
   first means for mapping first digital input data into an output including a number of ring indices;
   means for reordering said ring indices according to a reordering algorithm to thereby produce a number of reordered ring indices; and
   second means for mapping second digital input data into a number of signal points, said second means for mapping being responsive to said reordered ring indices;
   wherein said means for reordering reorders said ring indices according to a function f(x)=y, where x is the reordered ring index and y is the initial ring index; and for a data rate of approximately 40 kbits/second, f(0)= 4, f(1)=5, f(2)=2, f(3)=3, f(4)=0, f(5)=1, f(6)=6, f(7)=7, f(8)=8, f(9)=9, f(10)=10, and f(11)=11.

10. A signal point encoder comprising:
   first means for mapping first digital input data into an output including a number of ring indices;
   means for reordering said ring indices according to a reordering algorithm to thereby produce a number of reordered ring indices; and
   second means for mapping second digital input data into a number of signal points, said second means for mapping being responsive to said reordered ring indices;

wherein said means for reordering reorders said ring indices according to a function f(x)=y, where x is the reordered ring index and y is the initial ring index; and for a data rate of approximately 36 kbits/second, f(0)=0, f(1)=1, f(2)=2, f(3)=7, f(4)=5, f(5)=4, f(6)=6, f(7)=3, and f(8)=8.

11. A signal point encoder comprising:

first means for mapping first digital input data into an output including a number of ring indices;

means for reordering said ring indices according to a reordering algorithm to thereby produce a number of reordered ring indices; and second means for mapping second digital input data into a number of signal points, said second means for mapping being responsive to said reordered ring indices, wherein said second means for mapping assigns a unique signal point constellation for each of a plurality of data rates.

12. A signal point encoder according to claim 11, wherein, for a data rate of approximately 56 kbits/second, said second means for mapping includes a signal point constellation comprised of the following $\mu$-law signal points associated with ring indices m(0) to m(8):

| | |
|---|---|
| 0 | 6, 18, 30, 45, 57, 69, 81, 93 |
| 1 | 107, 123, 139, 155, 171, 187, 203, 219 |
| 2 | 231, 247, 263, 279, 295, 311, 327, 343 |
| 3 | 359, 375, 391, 407, 423, 439, 455, 471 |
| 4 | 495, 527, 559, 591, 623, 655, 687, 719 |
| 5 | 751, 783, 815, 847, 879, 911, 943, 975 |
| 6 | 1023, 1087, 1151, 1215, 1279, 1343, 1407, 1471 |
| 7 | 1535, 1599, 1663, 1727, 1791, 1855, 1919, 1983 |
| 8 | 2079, 2207, 2335, 2463, 2591, 2719, 2847, 2975 |

13. A signal point encoder according to claim 11, wherein, for a data rate of approximately 52 kbits/second, said second means for mapping includes a signal point constellation comprised of the following $\mu$-law signal points associated with ring indices m(0) to m(13):

| | |
|---|---|
| 0 | 12, 37, 61, 85 |
| 1 | 115, 139, 163, 187 |
| 2 | 211, 247, 279, 311 |
| 3 | 343, 375, 407, 439 |
| 4 | 471, 495, 527, 559 |
| 5 | 591, 623, 655, 687 |
| 6 | 719, 751, 783, 815 |
| 7 | 847, 879, 911, 943 |
| 8 | 975, 1023, 1087, 1151 |
| 9 | 1215, 1279, 1343, 1407 |
| 10 | 1471, 1535, 1599, 1663 |
| 11 | 1727, 1791, 1855, 1919 |
| 12 | 1983, 2079, 2207, 2335 |
| 13 | 2463, 2591, 2719, 2847 |

14. A signal point encoder according to claim 11, wherein, for a data rate of approximately 48 kbits/second, said second means for mapping includes a signal point constellation comprised of the following $\mu$-law signal points associated with ring indices m(0) to m(10):

| | |
|---|---|
| 0 | 16, 49, 81, 115 |
| 1 | 147, 179, 211, 247 |
| 2 | 279, 311, 343, 375 |
| 3 | 407, 439, 471, 527 |
| 4 | 559, 591, 623, 655 |
| 5 | 687, 719, 751, 783 |
| 6 | 815, 847, 879, 911 |
| 7 | 943, 975, 1023, 1087 |
| 8 | 1151, 1215, 1279, 1343 |
| 9 | 1407, 1471, 1535, 1599 |
| 10 | 1663, 1727, 1791, 1855 |

15. A signal point encoder according to claim 11, wherein, for a data rate of approximately 44 kbits/second, said second means for mapping includes a signal point constellation comprised of the following $\mu$-law signal points associated with ring indices m(0) to m(15):

| | |
|---|---|
| 0 | 33, 99 |
| 1 | 163, 231 |
| 2 | 295, 359 |
| 3 | 423, 495 |
| 4 | 559, 623 |
| 5 | 687, 751 |
| 6 | 815, 879 |
| 7 | 943, 1023 |
| 8 | 1087, 1151 |
| 9 | 1215, 1279 |
| 10 | 1343, 1407 |
| 11 | 1471, 1535 |
| 12 | 1599, 1663 |
| 13 | 1727, 1791 |
| 14 | 1855, 1919 |
| 15 | 1983, 2079 |

16. A signal point encoder according to claim 11, wherein, for a data rate of approximately 40 kbits/second, said second means for mapping includes a signal point constellation comprised of the following $\mu$-law signal points associated with ring indices m(0) to m(11):

| | |
|---|---|
| 0 | 37, 115 |
| 1 | 187, 263 |
| 2 | 343, 423 |
| 3 | 495, 591 |
| 4 | 687, 783 |
| 5 | 879, 975 |
| 6 | 1087, 1151 |
| 7 | 1215, 1279 |
| 8 | 1343, 1407 |
| 9 | 1471, 1535 |
| 10 | 1599, 1663 |
| 11 | 1727, 1791 |

17. A signal point encoder according to claim 11, wherein, for a data rate of approximately 36 kbits/second, said second means for mapping includes a signal point constellation comprised of the following $\mu$-law signal points associated with ring indices m(0) to m(8):

| | |
|---|---|
| 0 | 49, 147 |
| 1 | 247, 343 |
| 2 | 439, 559 |
| 3 | 655, 751 |
| 4 | 847, 943 |
| 5 | 1087, 1215 |
| 6 | 1343, 1471 |

-continued

| | |
|---|---|
| 7 | 1599, 1727 |
| 8 | 1855, 1983 |

18. A signal point encoder according to claim 11, wherein said reordering algorithm reorders said ring indices according to the average transmit energy associated with said ring indices.

19. A signal point encoder according to claim 18, wherein said reordering algorithm reorders said ring indices such that rings having relatively high energy are assigned to ring indices having relatively low frequencies of occurrence.

20. A method for encoding digital data into signal points, said method comprising the steps of:
receiving first digital data in a shell mapper;
generating a number of ring indices having a first ordering associated therewith, said generating step being performed in response to said first digital data;
reordering said ring indices to thereby produce a number of reordered ring indices having a second ordering different than said first ordering; and
mapping second digital input data into a number of signal points, said mapping step being responsive to said reordered ring indices;
wherein said reordering step comprises the steps of:
receiving said ring indices in a reordering module;
associating each of said ring indices with a corresponding reordered ring index stored in said reordering module; and
reassigning said ring indices to produce said second ordering of said reordered ring indices.

21. A method according to claim 20, wherein said reordering step reorders said ring indices according to the average transmit energy associated with said ring indices.

22. A method according to claim 21, wherein said reordering step reorders said ring indices such that rings having relatively high energy are assigned to ring indices having relatively low frequencies of occurrence.

23. A method for encoding digital data into signal points, said method comprising the steps of:
receiving first digital data in a shell mapper;
generating a number of ring indices having a first ordering associated therewith, said generating step being performed in response to said first digital data;
reordering said ring indices to thereby produce a number of reordered ring indices having a second ordering different than said first ordering; and
mapping second digital input data into a number of signal points, said mapping step being responsive to said reordered ring indices;
wherein said reordering step is responsive to a detected data rate of said digital data.

24. A method for reordering ring indices associated with a PCM modem system, said method comprising the steps of:
providing a signal point constellation having a number of rings associated therewith, said signal point constellation being utilized for digital data transmission by said PCM modem system;
selecting a minimum distance between adjacent signal points in said signal point constellation;
identifying a subset of said rings having at least one pair of adjacent signal points having said minimum distance therebetween; and
indexing said rings such that: (a) rings not in said subset are indexed in order of increasing average energy, (b) rings in said subset are indexed in order of increasing occurrences of adjacent signal point pairs having said minimum distance therebetween, and (c) rings in said subset are indexed higher than rings not in said subset.

25. A method according to claim 24, wherein said signal point constellation is comprised of $\mu$-law signal points.

26. A method according to claim 25, further comprising the step of arranging said signal point constellation such that pairs of adjacent signal points having relatively small separation distances are assigned to rings with relatively low frequencies of occurrence, while pairs of adjacent signal points having relatively large separation distances are assigned to rings with relatively high frequencies of occurrence.

27. A method according to claim 24, wherein said signal point constellation is uniquely associated with a transmit data rate supported by said PCM modem system.

28. A method according to claim 24, further comprising the step of programming a reordering module to produce a number of reordered ring indices in response to an input associated with a like number of initial ring indices, said programming step being responsive to said indexing step.

29. A method according to claim 24, further comprising the step of shifting the index of one of said rings to alter its probability of occurrence relative to at least one other of said rings.

30. A method according to claim 29, further comprising the steps of:
determining the average transmit power associated with said signal point constellation, said determining step being performed after said shifting step; and
repeating said shifting step for a different one of said rings when said average transmit power exceeds a predetermined threshold value.

31. A method according to claim 30, wherein:
said shifting step is performed for a first ring having relatively high energy associated therewith; and
said repeating step is performed for a second ring having lower energy, relative to said first ring, associated therewith.

32. A method according to claim 29, further comprising the steps of:
determining the average transmit power associated with said signal point constellation, said determining step being performed after said shifting step; and
modifying said signal point constellation to alter the number of rings associated therewith, said modifying step being performed when said average transmit power exceeds a predetermined threshold value.

33. A method according to claim 29, further comprising the steps of:
determining the average transmit power associated with said signal point constellation, said determining step being performed after said shifting step; and
modifying said minimum distance when said average transmit power exceeds a predetermined threshold value.

34. A method according to claim 29, wherein said shifting step comprises shifting a ring not in said subset with a ring in said subset.

35. A method according to claim 29, wherein said shifting step comprises shifting a first ring in said subset below a second ring in said subset, said first ring initially having a lower index than said second ring.

* * * * *